United States Patent
Zhang et al.

(10) Patent No.: US 10,168,558 B2
(45) Date of Patent: Jan. 1, 2019

(54) CHAMBER SEALING MECHANISM AND PRESSURIZATION BUBBLE-ELIMINATING EQUIPMENT

(71) Applicants: BOE TECHNOLOGY GROUP CO., LTD., Beijing (CN); HEFEI BOE OPTOELECTRONICS TECHNOLOGY CO., LTD., Hefei, Anhui (CN)

(72) Inventors: Bo Zhang, Beijing (CN); Jinjun Wang, Beijing (CN); Rui Hu, Beijing (CN); Ju Gao, Beijing (CN); Fanlin Ye, Beijing (CN); Awei Sui, Beijing (CN); Wenping Zhao, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 294 days.

(21) Appl. No.: 15/260,886

(22) Filed: Sep. 9, 2016

(65) Prior Publication Data
US 2017/0192259 A1    Jul. 6, 2017

(30) Foreign Application Priority Data
Jan. 4, 2016    (CN) .......................... 2016 1 0004366

(51) Int. Cl.
*G02F 1/13*    (2006.01)
*F16J 15/46*    (2006.01)
*F16J 15/02*    (2006.01)
*G02F 1/1339*    (2006.01)

(52) U.S. Cl.
CPC .......... *G02F 1/1303* (2013.01); *F16J 15/024* (2013.01); *F16J 15/46* (2013.01); *G02F 1/1339* (2013.01)

(58) Field of Classification Search
CPC .......... G02F 1/1303; F16J 15/46; F16J 15/024
See application file for complete search history.

(56) References Cited

U.S. PATENT DOCUMENTS 4,109,922 A    8/1978    Martin

FOREIGN PATENT DOCUMENTS

| CN | 1485558 A | 3/2004 |
|----|-----------|--------|
| CN | 201203731 Y | 3/2009 |
| CN | 203870353 U | 10/2014 |
| CN | 204226651 U | 3/2015 |
| EP | 2039420 A1 | 3/2009 |

OTHER PUBLICATIONS

The First Chinese Office Action dated Jan. 25, 2018; Appl. No. 201610004366.5.

*Primary Examiner* — Joseph L Williams
(74) *Attorney, Agent, or Firm* — Ladas & Parry LLP

(57) ABSTRACT

A chamber sealing mechanism and a pressurization bubble-eliminating equipment are provided. The chamber sealing mechanism includes an annular groove and a sealing ring, wherein the sealing ring and the annular groove are connected to form a closed cavity; the annular groove is provided with a gas charging valve that communicates with the closed cavity and is configured to charge air into the closed cavity and discharge air from the closed cavity.

18 Claims, 4 Drawing Sheets

US 10,168,558 B2

CHAMBER SEALING MECHANISM AND PRESSURIZATION BUBBLE-ELIMINATING EQUIPMENT

TECHNICAL FIELD

Embodiments of the present invention relate to the field of TFT production, and more specifically to a chamber sealing mechanism and a pressurization bubble-eliminating equipment comprising the same.

BACKGROUND

In the process for manufacturing a TFT-LCD, the following four steps are involved: preparing a color filter, fabricating an array substrate, preparing a liquid crystal cell, and assembling modules. During the process for assembling the modules, a bubble-eliminating process is applied to the LCD panel to which the filter has been attached so as to eliminate or reduce the bubbles generated during the attachment of the filter.

SUMMARY

The purpose of the present invention is to provide a chamber sealing mechanism and a pressurization bubble-eliminating equipment, which could solve the problem of frequently repairing the chamber sealing mechanism and reduce the downtime required for repairing the chamber sealing mechanism.

A first respect of the present invention is to provide a chamber sealing mechanism, which comprises an annular groove and a sealing ring, wherein the sealing ring and the annular groove are connected to form a closed cavity; the annular groove is provided with a gas charging valve that communicates with the closed cavity and is configured to charge air into the closed cavity and discharge air from the closed cavity A second respect of the present invention is to provide a pressurization bubble-eliminating equipment, which comprises a chamber door, wherein the chamber door is provided with the above chamber sealing mechanism.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Figure 1:
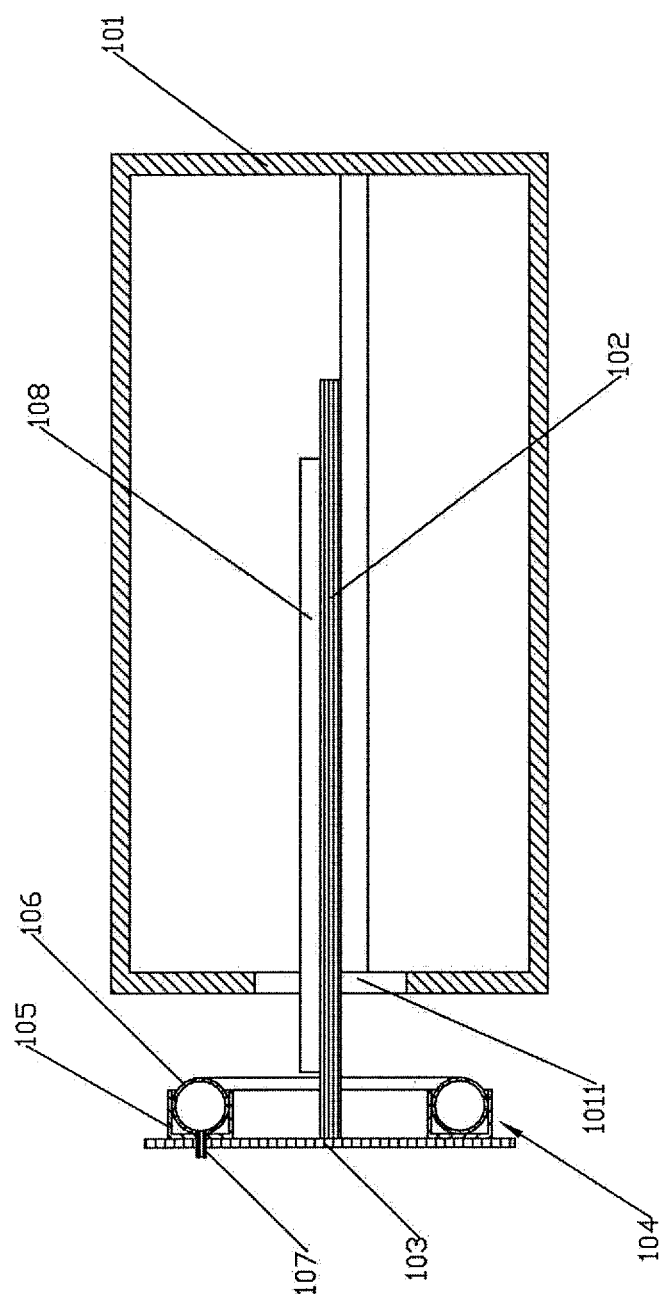
FIG. 1 is a sectional view of a pressurization bubble-eliminating equipment.

FIG. 1 is a sectional view of a pressurization bubble-eliminating equipment. As illustrated in FIG. 1, the pressurization bubble-eliminating equipment is a closed apparatus and comprises a bubble-eliminating chamber 101, a support plate 102 and a chamber door 103. The bubble-eliminating chamber 101 is provided with a chamber inlet/outlet 1011, i.e., the chamber opening. The support plate 102 is connected to the bubble-eliminating chamber 101 and capable of sliding in/out through the chamber opening 1011. The chamber door 103, fixed to the support plate 102, is provided with a chamber sealing mechanism 104 for sealing the chamber inlet/outlet 1011 so as to make the bubble-eliminating chamber be a closed space. Chamber sealing mechanism 104 comprises an annular groove 105 disposed at the chamber door 103 and an O-ring 106 disposed in the annular groove 105. The O-ring 106 is provided with a gas charging valve 107 and the annular groove 105 is provided with a hole through which the gas charging valve 107 protrudes. During the operation, the LCD panel 108 is placed on the support plate 102, and then the support plate 102 is pushed into the chamber 101. While the pressurization bubble-eliminating procedure is performed, air is charged into the O-ring 106 through the gas charging valve 107 to make the chamber inlet/outlet 1011 sealed by the O-ring 106. Since the gas charging valve 107 is confined in the hole and the O-ring 106 is movable along the annular groove 105, the joint between the gas charging valve 107 and the O-ring 106 is apt to be damaged, and thus the bubble-eliminating chamber 101 fails to be fully sealed. Therefore, the equipment has to be shut down frequently to get the chamber sealing mechanism repaired, resulting in the decreased productivity and the waste of time and energy for element replacement.

Figure 2:
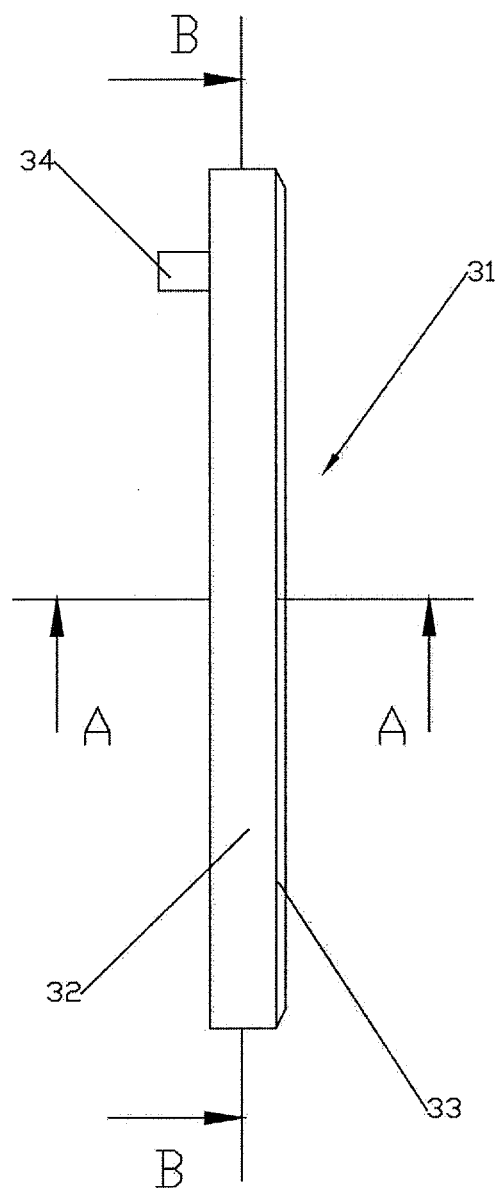
FIG. 2 is a top view of a chamber sealing mechanism according to an embodiment of the present invention.
Figure 3:
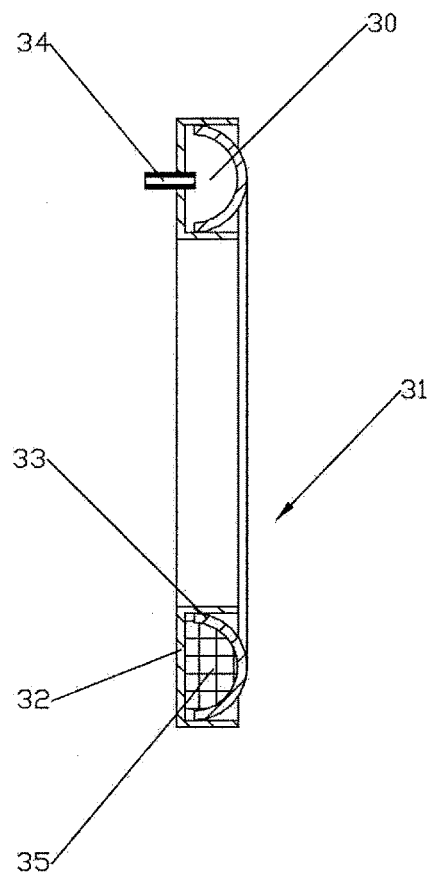
FIG. 3 is a sectional view of FIG. 2 along A-A.
Figure 4:
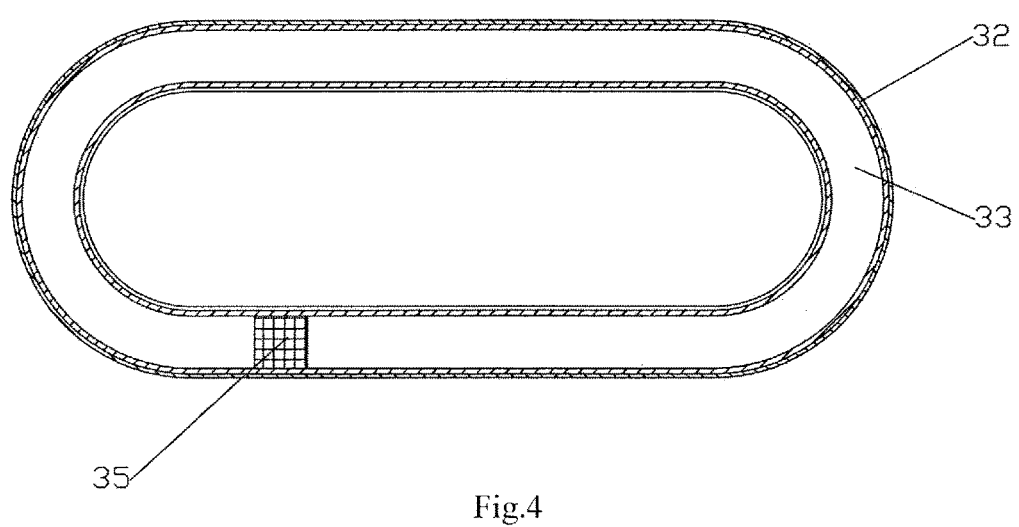
FIG. 4 is a sectional view of FIG. 2 along B-B.

As illustrated in FIG. 2 to FIG. 4, the chamber sealing mechanism 31 according to an embodiment of the present invention includes an annular groove 32 and a sealing ring 33. The sealing ring 33 is connected to the annular groove 32 and together they form a closed cavity 30. The annular groove 32 is provided with a gas charging valve 34 which communicates with the closed cavity 30 and is used to charging air into the closed cavity 30 or discharging air from the closed cavity 30.

During the operation, the external air supply equipment connects to the gas charging valve 34 and supplies air to the closed cavity 30 through the gas charging valve 34, so that the sealing ring 33 expands and thus seals the bubble-eliminating chamber. In the pressurization bubble-eliminating equipment comprising the chamber sealing mechanism according to the present embodiment, the sealing ring 33 and the annular groove 32 define a closed cavity 30 with the gas charging valve 34 disposed in the annular groove 32 and disconnected from the sealing ring 33, which could avoid the damage to the sealing ring caused by the movement of the gas charging valve, decrease the frequency of the damage to the sealing ring 33, reduce the downtime required for repairing the chamber sealing mechanism, and improve the pressurization bubble-eliminating efficiency.

In at least some of the embodiments, a blocking member 35 is provided within the closed cavity 30 to block airflow and thus prevent the gas charging valve 34 from the airflow interference within the closed cavity 30, thereby reducing the damage to the chamber sealing mechanism, increasing the lifetime of the chamber sealing mechanism, and reducing the downtime of the bubble-eliminating equipment.

In at least some of the embodiments, the sealing ring 33 is a U-shape sealing ring, i.e., the sealing ring has a U-shape section. In the present embodiment, the U-shape sealing ring and the annular groove 32 adhere to each other by adhesive such as glue with their openings arranged facing to each other. As illustrated in FIG. 3, the opening of the U-shape sealing ring is accommodated in the annular groove 32 and has substantially the same area as the opening of the annular groove 32, so that the closed cavity is formed. The sealing ring 33 and the blocking member 35 are made of rubber, which is elastic and cheap.

In at least some of the embodiments, the annular groove 32 is made of iron or aluminum alloy. The gas charging valve 34 is made of iron.

It is noted that the chamber sealing mechanism according to the embodiments of the present invention not only applies to the pressurization bubble-eliminating equipment, but also applies to the chamber door of other equipments.

Figure 5:
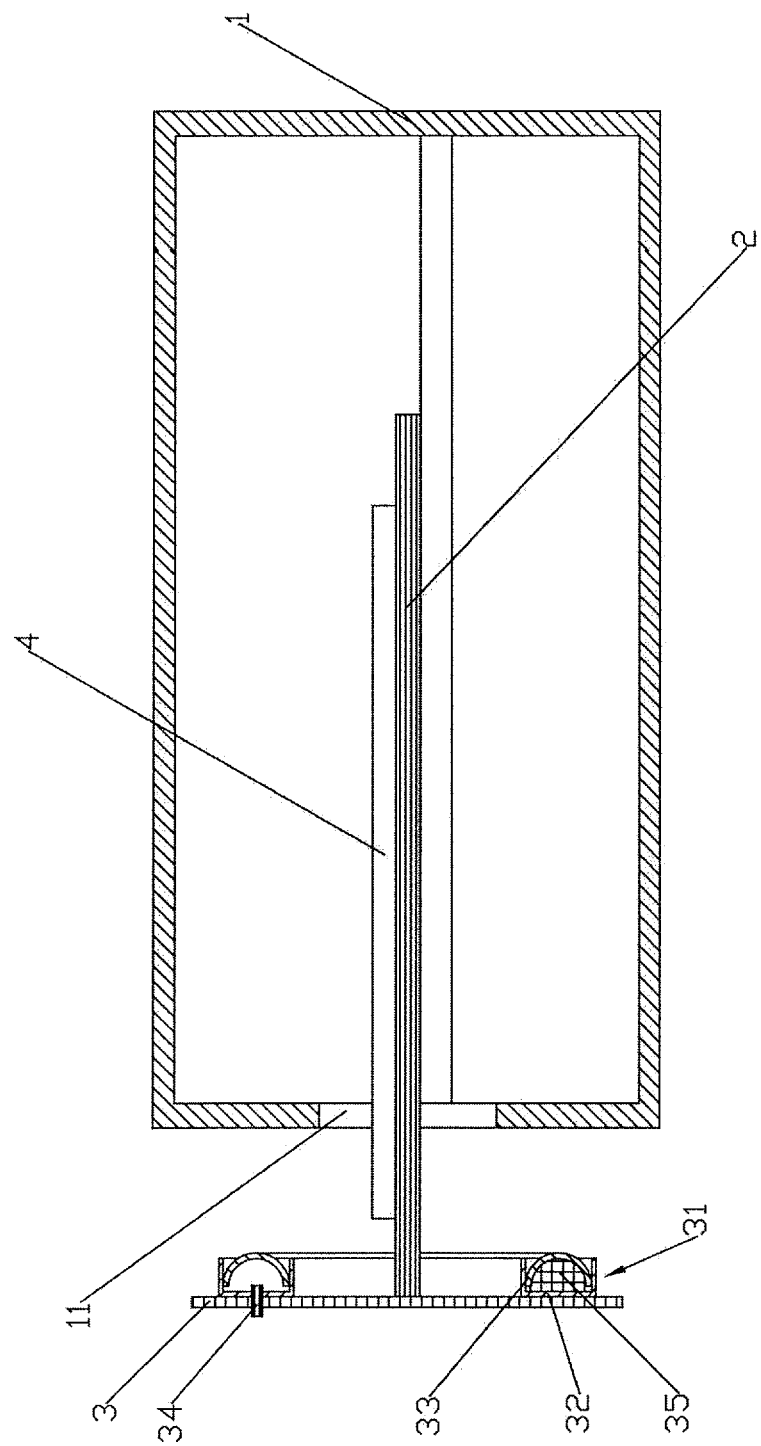
FIG. 5 is a sectional view of a pressurization bubble-eliminating equipment according to an embodiment of the present invention.

As illustrated in FIG. 5, the pressurization bubble-eliminating equipment according to another embodiment of the present invention comprises a bubble-eliminating chamber 1, a support plate 2 and a chamber door 3. The bubble-eliminating chamber 1 is provided with a chamber inlet/outlet 11. The support plate 2 is connected to the bubble-eliminating chamber 1 and capable of sliding in/out through the chamber inlet/outlet 11. The chamber door 3 is fixed to the support plate 2. The chamber door 3 is provided with the chamber sealing mechanism 31 according to the above embodiment. As illustrated in FIG. 5, the annular groove 32 is disposed at the side of the chamber door 3 close to the bubble-eliminating chamber 1, i.e., the opening of the annular groove 32 faces to the bubble-eliminating chamber 1. The opening of the sealing ring 33 is opposite to the bubble-eliminating chamber 1 and thus arranged facing to the opening of the annular groove 32, so that the closed cavity is formed therebetween. During the operation, the LCD panel 4 is placed on the support plate 2, and then the support plate 2 is pushed into the bubble-eliminating chamber 1. Air is charged into the closed cavity 30 to make the sealing ring 33 abutted against the external wall of the bubble-eliminating chamber 1 so as to achieve the sealing effect. In the pressurization bubble-eliminating equipment of the present embodiment, the sealing ring 33 and the annular groove 32 define a closed cavity 30 with the gas charging valve 34 disposed in the annular groove 32 and disconnected from the sealing ring 33, which could avoid the damage to the sealing ring caused by the movement of the gas charging valve, decrease the frequency of the damage to the sealing ring 33, reduce the downtime required for repairing the chamber sealing mechanism, and improve the pressurization bubble-eliminating efficiency.

In at least some of the embodiments, the chamber door 3 and the support plate 2 are connected by welding, or detachably connected by a screw bolt assembly.

In at least some of the embodiments, the annular groove 32 and the chamber door 3 are detachably connected so as to facilitate the replacement and the maintenance of the chamber sealing mechanism.

In at least some of the embodiments, the circular 32 and the chamber door 3 may be formed integrally, i.e., the circular 32 is molded on the chamber door 3.

Above descriptions are merely exemplary embodiments and not intent to limit the protection scope of the present invention, which is defined by the appending claims.

The present application is based on the Chinese Patent Application No. 201610004366.5, filed on Jan. 4, 2016, and claims the priority thereof. The entire disclosure of this application is incorporated herein by reference.

The invention claimed is:

1. A chamber sealing mechanism comprising an annular groove and a sealing ring, wherein the sealing ring and the annular groove are connected to form a closed cavity; the annular groove is provided with a gas charging valve that communicates with the closed cavity and is configured to charge air into the closed cavity and discharge air from the closed cavity.

2. The chamber sealing mechanism of claim 1, wherein a blocking member is provided within the closed cavity to block airflow.

3. The chamber sealing mechanism of claim 1, wherein the sealing ring has a U-shape section.

4. The chamber sealing mechanism of claim 1, wherein the sealing ring is made of rubber.

5. The chamber sealing mechanism of claim 2, wherein the blocking member is made of rubber.

6. The chamber sealing mechanism of claim 1, wherein the annular groove is made of iron or aluminum alloy.

7. The chamber sealing mechanism of claim 1, wherein the gas charging valve is made of iron.

8. The chamber sealing mechanism of claim 1, wherein the gas charging valve is disconnected from the sealing ring.

9. The chamber sealing mechanism of claim 3, wherein an opening of the sealing ring and an opening of the annular groove are arranged to face to each other and adhere to each other by an adhesive.

10. A pressurization bubble-eliminating equipment comprising a chamber door, wherein the chamber door is provided with the chamber sealing mechanism according to claim 1.

11. The pressurization bubble-eliminating equipment of claim 10, the annular groove and the chamber door are detachably connected.

12. The pressurization bubble-eliminating equipment of claim 10, further comprising a support plate configured for supporting a display panel, wherein the chamber door is fixed on the support plate.

13. The pressurization bubble-eliminating equipment of claim 12, wherein the chamber door and the support plate are detachably connected.

14. The pressurization bubble-eliminating equipment of claim 10, further comprising a bubble-eliminating chamber which is provided with a chamber opening, wherein the support plate is connected to the bubble-eliminating chamber and configured to slide in/out through the chamber opening.

15. The pressurization bubble-eliminating equipment of claim 10, wherein a blocking member is provided within the closed cavity to block airflow.

16. The pressurization bubble-eliminating equipment of claim 10, wherein the sealing ring has a U-shape section.

17. The pressurization bubble-eliminating equipment of claim 16, wherein an opening of the U-shape sealing ring and an opening of the annular groove are arranged to face to each other and adhere to each other by an adhesive.

18. The pressurization bubble-eliminating equipment of claim 10, wherein the gas charging valve is disconnected from the sealing ring.

* * * * *